(12) United States Patent
Mischke et al.

(10) Patent No.: US 9,917,407 B1
(45) Date of Patent: Mar. 13, 2018

(54) HIGH-DEFINITION MULTIMEDIA INTERFACE (HDMI) CABLE INTEGRATED WITH A MEDIA DEVICE

(71) Applicant: Google Inc., Mountain View, CA (US)

(72) Inventors: Colleen Mischke, Sunnyvale, CA (US); Maurice Alou, Menlo Park, CA (US); Philip Lee Ly, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/259,890

(22) Filed: Sep. 8, 2016

Related U.S. Application Data

(60) Provisional application No. 62/215,571, filed on Sep. 8, 2015.

(51) Int. Cl.
| | |
|---|---|
| H01R 13/6592 | (2011.01) |
| H01R 24/20 | (2011.01) |
| H01R 13/6581 | (2011.01) |
| H01R 43/20 | (2006.01) |
| H01R 107/00 | (2006.01) |

(52) U.S. Cl.
CPC ..... *H01R 13/6592* (2013.01); *H01R 13/6581* (2013.01); *H01R 24/20* (2013.01); *H01R 43/20* (2013.01); *H01R 2107/00* (2013.01)

(58) Field of Classification Search
CPC .... H01R 24/20; H01R 24/22; H01R 13/6581; H01R 43/20; H01R 13/6592
See application file for complete search history.

(56) References Cited

U.S. PATENT DOCUMENTS

| | | | | |
|---|---|---|---|---|
| 4,639,053 A * | 1/1987 | Reichardt | ........ | H01R 13/65802 439/497 |
| 5,358,428 A * | 10/1994 | Bixler | ................ | H01R 13/6593 439/406 |
| 5,411,415 A * | 5/1995 | Embo | ................ | H01R 13/6581 439/607.5 |
| 5,521,331 A * | 5/1996 | Hillburn | ............ | H01B 11/1826 156/54 |
| 5,567,169 A * | 10/1996 | McCleerey | ........ | H01R 13/6485 439/181 |
| 5,834,693 A * | 11/1998 | Waddell | .................. | G06F 1/182 174/657 |
| 6,302,740 B1 * | 10/2001 | Holmstrom | ............ | H01R 9/034 439/607.41 |
| 8,771,013 B2 * | 7/2014 | Kalayjian | ............ | H01R 9/0518 439/585 |
| 9,178,314 B2 * | 11/2015 | Dickens | ............ | H01R 13/6461 |
| 9,640,913 B1 * | 5/2017 | Wang | ................ | H01R 13/6471 |
| 2009/0079264 A1 * | 3/2009 | Minami | .................. | G06F 1/266 307/44 |
| 2010/0190373 A1 * | 7/2010 | Yeh | ...................... | H01R 12/774 439/499 |
| 2011/0122323 A1 * | 5/2011 | Kim | ...................... | H01B 7/0892 348/739 |

(Continued)

*Primary Examiner* — James Harvey
*Assistant Examiner* — Oscar Jimenez
(74) *Attorney, Agent, or Firm* — Brake Hughes Bellermann LLP

(57) ABSTRACT

In one general aspect, an apparatus can include an output cord segment including an LVDS connector disposed in a housing and an HDMI connector.

21 Claims, 12 Drawing Sheets

(56) References Cited

U.S. PATENT DOCUMENTS

| | | | | |
|---|---|---|---|---|
| 2012/0028488 A1* | 2/2012 | Puschnigg | ............. | G06F 1/266 |
| | | | | 439/189 |
| 2012/0133750 A1* | 5/2012 | Talbert | ............... | A61B 1/00002 |
| | | | | 348/65 |
| 2012/0182483 A1* | 7/2012 | Kim | ..................... | H01R 12/50 |
| | | | | 348/739 |
| 2013/0265384 A1* | 10/2013 | Shoemake | ............... | H04N 7/15 |
| | | | | 348/14.08 |
| 2015/0229048 A1* | 8/2015 | Kim | ..................... | H01R 12/50 |
| | | | | 361/679.21 |
| 2016/0100509 A1* | 4/2016 | Yanagihara | ............ | H01R 9/034 |
| | | | | 174/350 |

\* cited by examiner

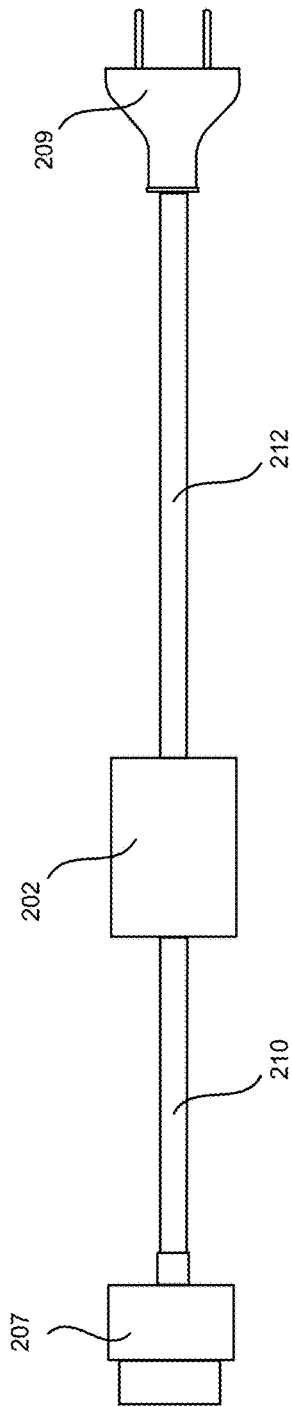
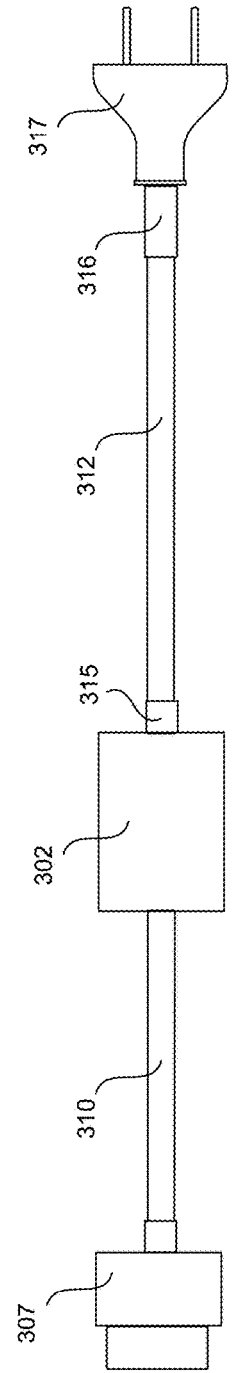
FIG. 2
FIG. 3

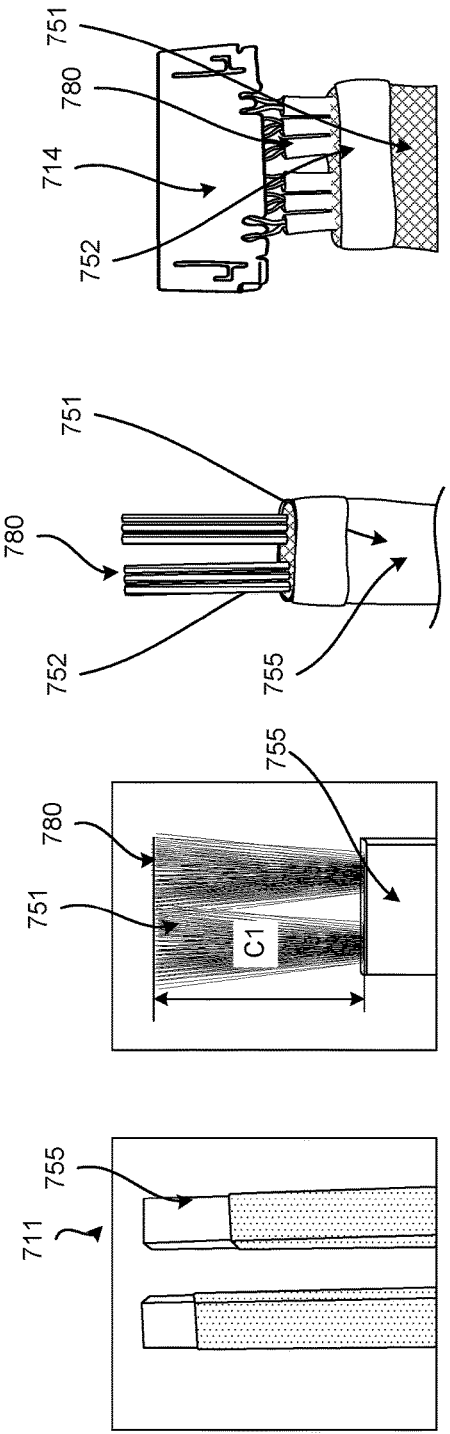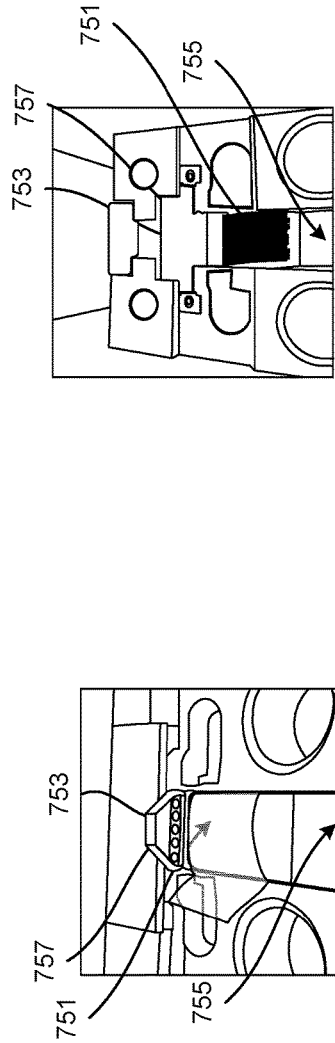

HIGH-DEFINITION MULTIMEDIA INTERFACE (HDMI) CABLE INTEGRATED WITH A MEDIA DEVICE

CROSS REFERENCE TO RELATED APPLICATION

This application is a Nonprovisional of, and claims priority to, U.S. Patent Application No. 62/215,571, filed on Sep. 8, 2015, entitled "HIGH-DEFINITION MULTIMEDIA INTERFACE (HDMI) CABLE INTEGRATED WITH A MEDIA DEVICE", which is incorporated by reference herein in its entirety.

TECHNICAL FIELD

This description relates to improved high-definition multimedia interface (HDMI) cable integrated with a media device.

BACKGROUND

Streaming media devices can be used to stream content onto a receiving device. In some examples, a streaming media device may be plugged into a connector on a receiving device. Then, a device executing an application may provide video and/or audio cotent to the media streaming device, which is then provided to the receiving device for rendering. The known cable designs associated with media streaming devices, however, may not provide desirable performance. Thus, a need exists for systems, methods, and apparatus to address the shortfalls of present technology and to provide other new and innovative features.

SUMMARY

In one general aspect, an apparatus can include an output cord segment including an LVDS connector disposed in a housing and an HDMI connector. A cord portion can be coupled between the LVDS connector and the HDMI connector. The cord portion can be coupled to the LVDS connector via a connection portion. The connection portion can include a stack including at least a portion of a wire region, a first portion of a shield material, a sheath material, a second portion of the shield material, a flexible conductor, a shield connector, and a third portion of a shield material. The third portion of the shield material can be soldered to the shield connector.

The details of one or more implementations are set forth in the accompanying drawings and the description below. Other features will be apparent from the description and drawings, and from the claims.

BRIEF DESCRIPTION OF THE DRAWINGS

FIG. 2 illustrates a media streaming device fixedly coupled to a power cord segment and fixedly coupled to an output cord segment according to an implementation.

FIG. 3 illustrates a media streaming device removably coupled to a power cord segment and fixedly coupled to an output cord segment according to an implementation.

FIGS. 7A through 7G are diagrams that illustrate a method for manufacturing at least some portions of an output cord segment.

DETAILED DESCRIPTION

The present disclosure provides a media streaming device suspended between two cord segments, where one cord segment is a cable for transferring media content over a particular media transfer interface (e.g., a high-definition multimedia interface (HDMI) output cable or audio cable), and the other cord segment is a power cord coupled to a power supply (e.g., DC or AC power supply). The media streaming device may be small and lightweight such that the media streaming device can be suspended between the two cord segments. In some examples, one or both of the two cord segments may be flexible yet sufficiently rigid to suspend the media streaming device. Further, the length of the cord segments may be designed such that the media streaming device is suspended at a position away from a receiving device in a manner that minimizes interference or port blocking of adjacent HDMI connections at the receiving device and/or far enough away from the receiving device to reduce negative effects on the device's radio-frequency (RF) performance.

The media streaming device (also can be referred to as a media device) may have a certain size, shape, and weight, and the cord segments may have a certain thickness such that from a point of view of the user, the overall streaming solution appears as a single continuation cord with an electronic module integrated within the cord. In some conventional media streaming devices, the connector directly extends from a housing of the media streaming device, and the connector of the media streaming device is plugged directly into the connector of the receiving device (e.g., a media streaming dongle or media streaming stick). In contrast, in various implementations of the present disclosure, the cord segment is coupled to the media streaming device and the connector is disposed on the end portion of the cord segment such that the receiving device is connected to the media streaming device via the cord segment, and the cord segment has a certain thickness and rigidity in order to suspend the media streaming device at a location away from the receiving device. In some examples, one or both of the cord segments may include a memory-shape material configured to maintain a certain shape.

Figure 1:
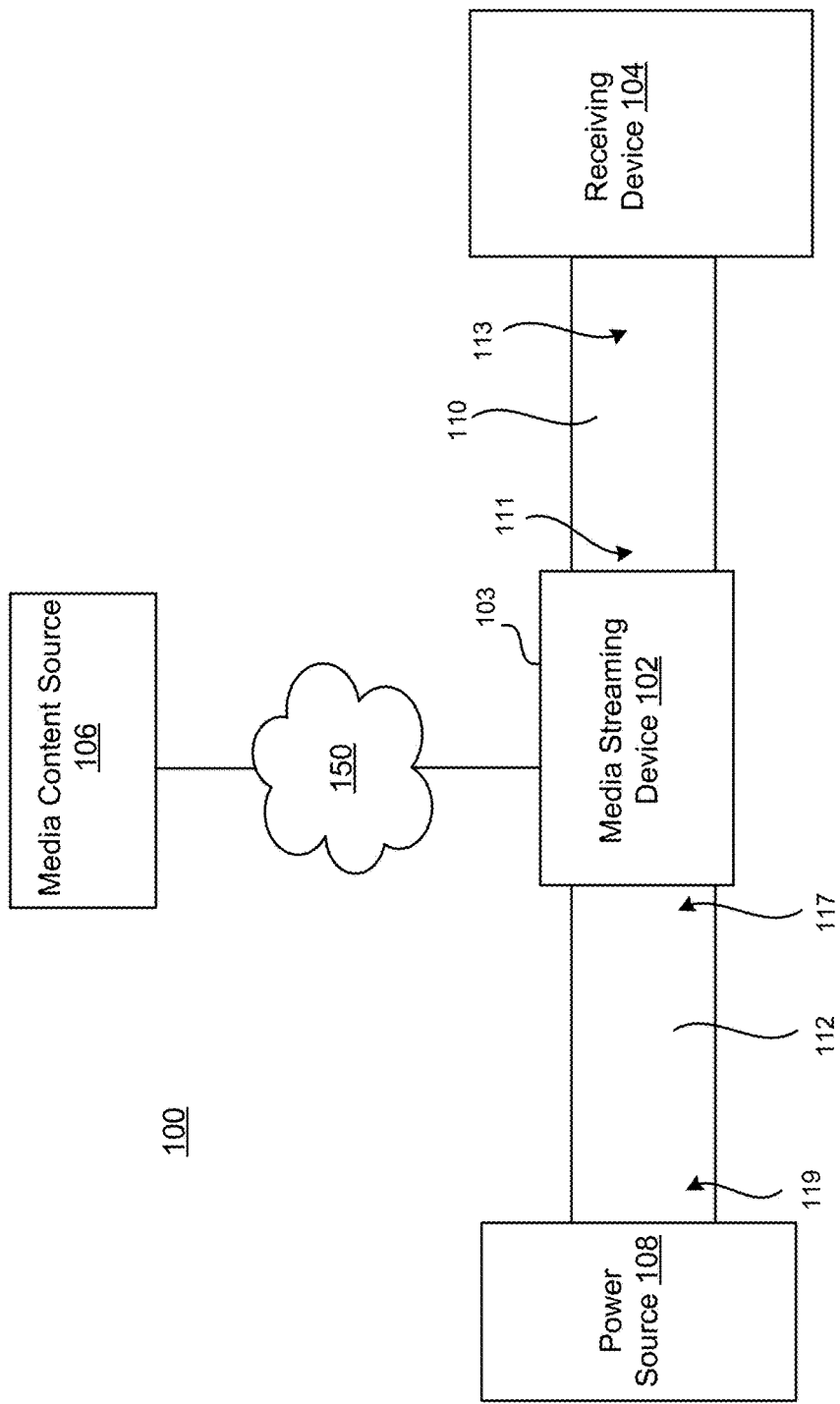
FIG. 1 illustrates a system for streaming media content according an implementation.
Figure 4:
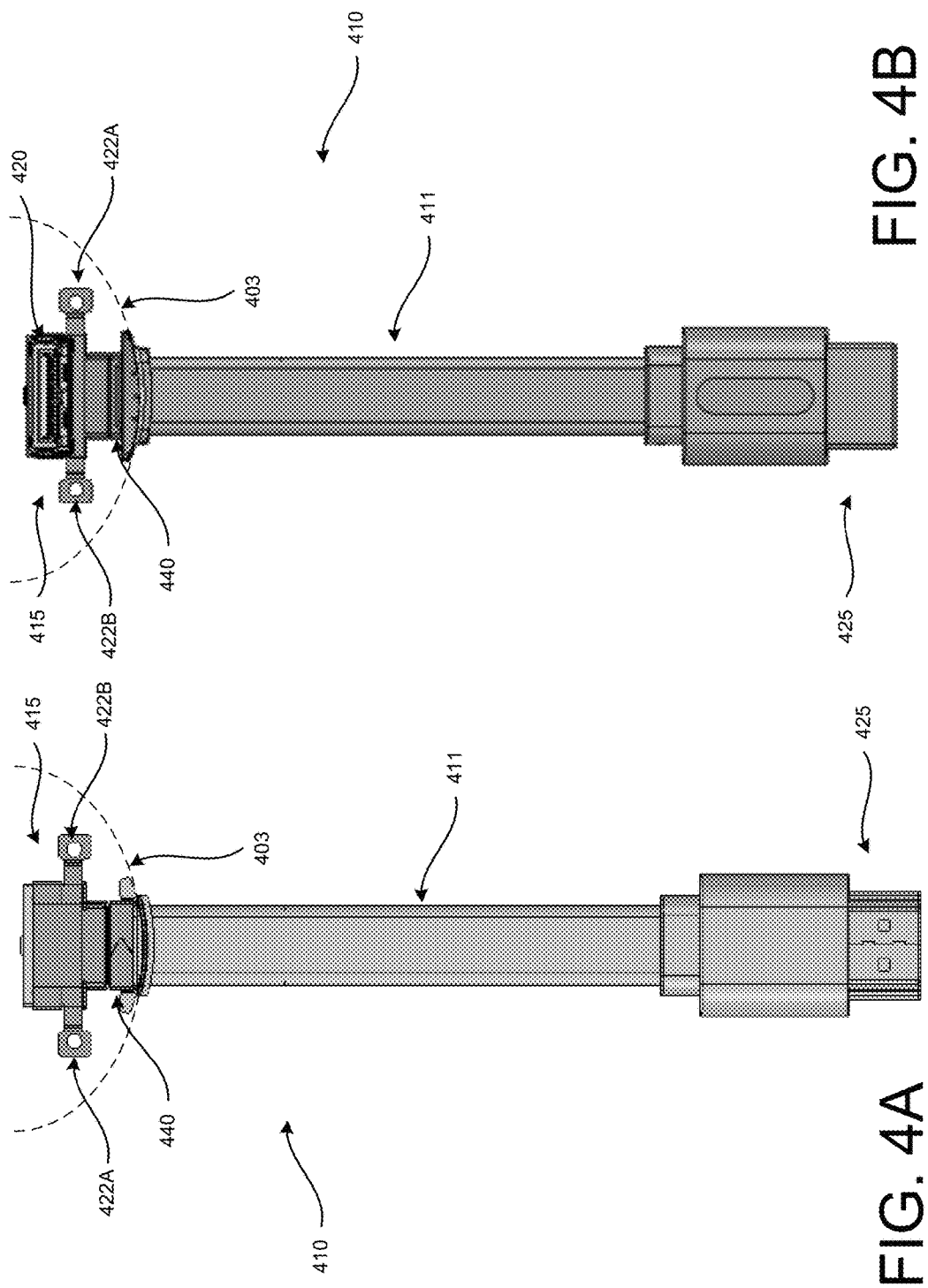
FIGS. 4A and 4B are diagrams that illustrate an output cord segment including a low-voltage differential signaling (LVDS) connector according to an implementation.
Figure 5:
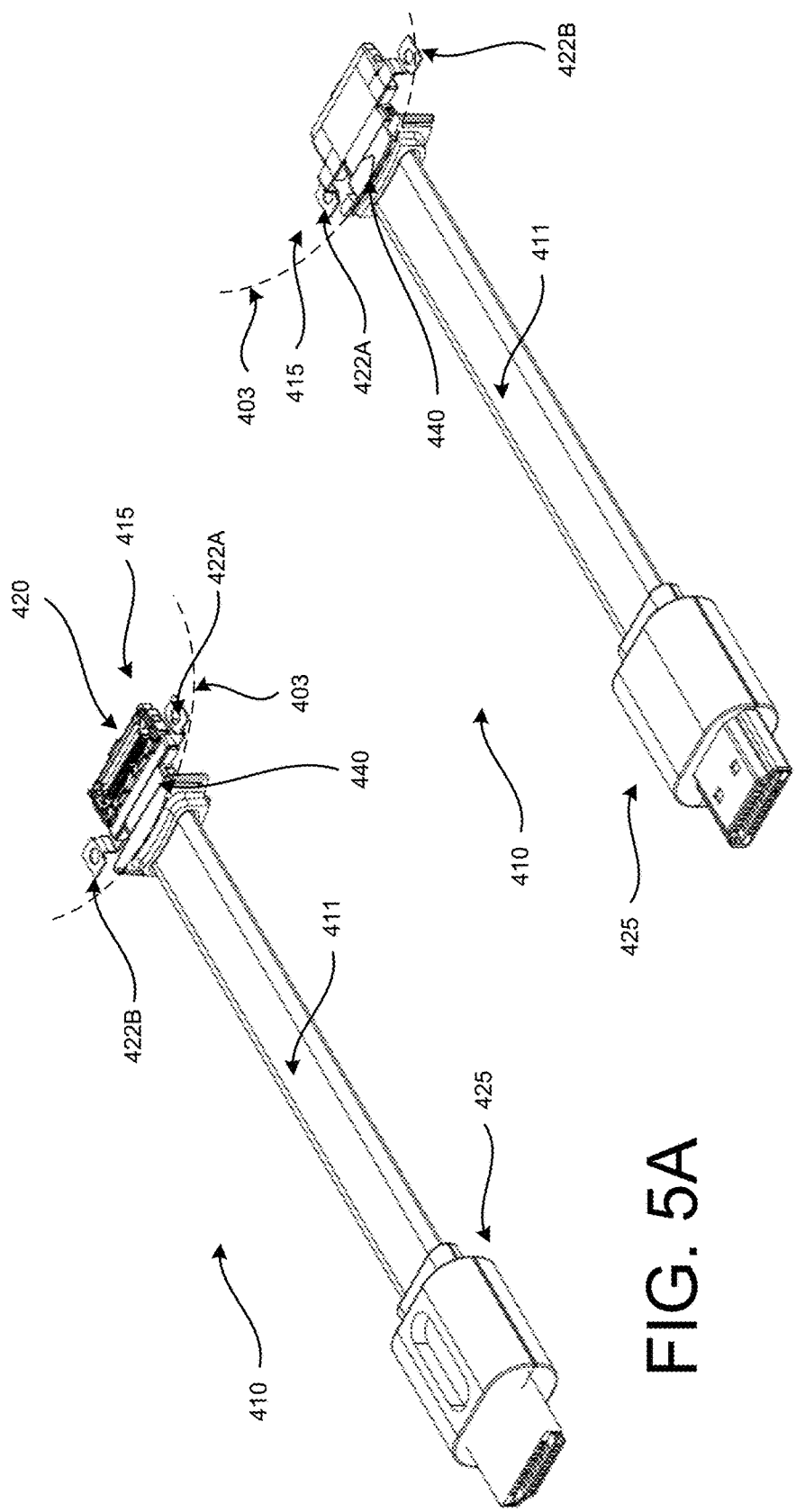
FIGS. 5A and 5B are diagrams that illustrate perspective views of an output cord segment including an LVDS connector according to an implementation.

FIG. 1 illustrates a system 100 for implementing a streaming solution according an implementation. The system 100 includes a media streaming device 102 configured to transfer, over a wireless connection, streamed media content from a media content source 106 to a receiving device 104. The receiving device 104 may be any type of device capable of receiving and then rendering audio and/or video content. In some examples, the receiving device 104 may include or otherwise be connected to a display screen capable of displaying the video content. The display screen may be a liquid crystal display (LCD), plasma display, cathode tube, or any type of display screen technology known to one of ordinary skill in the art. The receiving device 104 may include or be connected to one or more speakers capable of rendering the audio content. In some examples, the receiving device 104 may be a television set, standalone display device, tablet, gaming console, or a laptop computer, etc. In some examples, the receiving device 104 may be an audio device capable of rendering the audio content (not the video content).

The media streaming device 102 may include a system on chip (SOC) and one or more wireless interfaces having one or more antenna structures designed to wirelessly receive and transmit data. The SOC may be an integrated circuit that integrates two or more components into a chip, and may contain digital, analog, mixed-signal, and may include radio-frequency functions. In other examples, the radio-frequency functions may be provided on a separate chip. The media streaming device 102 may be configured to stream the media content from the media content source 106 to the receiving device 104 over a network 150.

The media streaming device 102 may be coupled to the receiving device 104 via an output cord segment 110, and the media streaming device 102 may be coupled to a power source 108 via a power cord segment 112. The output cord segment 110 may provide the physical connection between the media streaming device 102 and the receiving device 104, where the media content is routed from the media streaming device 102 to the receiving device 104 via the output cord segment 110. In some examples, the output cord segment 110 is an HDMI cord segment. In some examples, the output cord segment 110 is an audio cord segment (digital or analog).

The output cord segment 110 may include one or more materials that are configured to transfer audio and/or video content from the media streaming device 102 to the receiving device 104. In some examples, the output cord segment 110 may include an outer material configured to enclose one or more metal wires (which can be referred to as conductors). In some examples, the output cord segment 110 may include a first material that is flexible yet sufficiently rigid to suspend the media streaming device 102. In some examples, the first material is a polymer-based material. In some examples, the first material is a memory-shape material. In some examples, the output cord segment 110 includes one or more memory-shape wires. In some examples, the power cord segment 112 includes a second material that is flexible yet sufficiently rigid to suspend the media streaming device 102. In some examples, the second material is a polymer-based material. In some examples, the second material is a memory-shape material. In some examples, the first material is the same as the second material. In other examples, the first material is different than the second material.

The output cord segment 110 may include a first end portion 111 configured to be coupled to the housing 103 of the media streaming device 102, and a second end portion 113 configured to be coupled to the receiving device 104. The first end portion 111 may be fixedly coupled to the media streaming device 102. For example, the first end portion 111 may be integrally coupled to the housing 103 of the media streaming device 102. The first end portion 111 may define a connector configured to be coupled to a corresponding connector of the media streaming device 102.

In some examples, the connectors may be contained within the housing 103 of the media streaming device 102 such that the output cord segment 110 is integrally coupled to the media streaming device 102. In some examples, the connector of the first end portion 111 is a low-voltage differential signaling (LVDS) connector. In some examples, the connector of the first end portion 111 is an audio-type connector. The second end portion 113 may be removably coupled to the receiving device 104. In some examples, the second end portion 113 may define a connector such as an HDMI connector (or receptacle) to be coupled to a HDMI connector (or receptacle) associated with the receiving device 104. In some examples, the connector of the second end portion 113 is an audio-type connector configured to be coupled to a corresponding connector of the receiving device 104. In some implementations, the HDMI connector can be replaced with, or used in addition to, a different type of media connector.

The length of the output cord segment 110 may be designed such that it is short enough to remain relatively close to the receiving device 104 (e.g., potentially hidden from the user) but long enough to reduce one or more problems associated with plugging the media streaming device 102 directly into the receiving device's port. In some examples, the length of the output cord segment 110 may be less than a length of the receiving device 104. In some examples, the length of the output cord segment 110 may be less than a length (or width) of a display screen of the receiving device 104. Also, the material(s) of the output cord segment 110 have properties such that when a force is not applied to the media streaming device 102 (the media streaming device 102 being integrally coupled to one end of the output cord segment 110, the other end of the output cord segment 110 being coupled to the receiving device 104), the media streaming device 102 remains a distance from the receiving device 104 that is more than one half of the length of the output cord segment 110. At the same time, the output cord segment 110 can be sufficiently flexible to permit the user to bend the output cord segment 110 to a desired location (e.g., to hide the media streaming device 102 or improve the wireless functionality of the media streaming device 102).

More details regarding the output cord segment 110, including methods of manufacturing components thereof, are described and shown in connection with the remaining figures including FIGS. 2 through 11B.

The media streaming device 102 shown in FIG. 1 may have a housing 103 configured to house the components of the media streaming device 102. The housing 103 may be a unitary component or multiple components coupled together. The housing 103 may have a circular, rectangular, or any type of non-circular and/or non-rectangular shape. In some examples, the housing 103 may be cylindrical (e.g., puck shape).

The network 150 may be any type of public or private communication network such as the Internet (e.g. Wi-Fi, mobile network, etc.) or short-range communication network (e.g., Bluetooth, near-field communication (NFC), etc.). The media content may include video and/or audio data. The media content source 106 may be any type of device capable of providing the media content. The media content source 106 may be a consumer computing device such as a tablet, smartphone, desktop computer, laptop computer, tablet, gaming console, etc. In other examples, the media content source 106 may be one or more server devices that host one or more applications configured to provide the media content over the network 150.

The power cord segment 112 may provide the physical connection between the media streaming device 102 and the power source 108. The power source 108 may be an AC power source such as an AC wall socket, for example. In other examples, the power source 108 is a DC power source such as another computing device. The power cord segment 112 is configured to transfer power from the power source 108 to the media streaming device 102. In some examples, the power cord segment 112 is a universal serial bus (USB) power cord. In some examples, the power cord segment 112 is a USB power and data cord.

The power cord segment 112 may be longer than the output cord segment 110. In other examples, the power cord segment 112 is shorter than the output cord segment 110. In other examples, the power cord segment 112 is the same length as the output cord segment 110. In some examples, the power cord segment 112 has a larger diameter than the output cord segment 110. In other examples, the power cord segment 112 has a small diameter than output cord segment 110. In other examples, the power cord segment 112 as the same diameter as the output cord segment 110.

The power cord segment 112 may include a first end portion 117 configured to be coupled to the media streaming device 102, and a second end portion 119 configured to be coupled to the power source 108. The first end portion 117 of the power cord segment 112 may be removably coupled to the media streaming device 102. In other examples, the first end portion 117 of the power cord segment 112 may be fixedly coupled to the media streaming device 102. In some examples, the first end portion 117 of the power cord segment 112 may define a male USB connector to be coupled to a female USB connector on the media streaming device 102. The second end portion 119 of the power cord segment 112 may define a power plug adaptor to be inserted into a wall socket. In some examples, the second end portion 119 may define a USB connector configured to be coupled to a device. In some examples, the second end portion 119 may define a USB connector and a power plug adaptor, where the USB connector is removably coupled to the power plug adaptor. In some examples, the outer housing 103 of the media streaming device 102 may have a tubular shape that is the same or similar to the shape of the output cord segment 110 and/or the power cord segment 112. In some examples, the outer housing 103 may be larger than the output cord segment 110 and the power cord segment 112.

The media streaming device 102 may be relatively small and lightweight such that the cord segments 110, 112 can suspend the media streaming device 102 along the assembled system 100. In some examples, the output cord segment 110 integrally coupled to the media streaming device 102 is sufficiently rigid such that the output cord segment 110 can support the media streaming device's weight. For example, relative to the weight of the media streaming device 102, the material of the output cord segment 110 includes one or more properties that make the output cord segment 110 flexible yet rigid such that, when assembled, the output cord segment can support the weight of the media streaming device 102. In some examples, the output cord segment 110 may include one or more materials that define an elasticity above a certain threshold, and that threshold is chosen relative to the weight of the media streaming device 102. For instance, under the load of the media streaming device 102, the output cord segment 110 can substantially maintain its shape. The output cord segment 110 can have a certain non-bendability in the sense that it can substantially resist deformation in response to the weight of the media streaming device 102. In some examples, when a force greater than the force of the media streaming device 102 is applied to the output cord segment 110, the output cord segment 110 can bend and hold that bent shape.

Once assembled, the user may perceive the streaming solution (the media streaming device 102 with cord segments 110, 112) as a cable assembly (e.g., a unitary cable assembly) with a power plug on one end and the output on the other end. For instance, when the connector of the output cord segment 110 is coupled to the receiving device 104 and the power cord segment 112 is coupled to the media streaming device 102 and the power source 108, the media streaming device 102 is configured to be suspended at a distance away from the receiving device 104.

In some examples, when coupled to the cord segments 110, 112, the media streaming device 102 is suspended in air. For instance, when coupled to the cord segments 110, 112, the media streaming device 102 does not contact (or otherwise rest) on the ground or another object (including the receiving device 104). Rather, the media streaming device 102 remains at a position away from the receiving device 104. In some examples, when the streaming solution is assembled, the output cord segment 110 bends (thereby creating one or more bend portions) to a certain point such that the media streaming device 102 does not contact any portion of the receiving device 104. In some examples, the output cord segment 110 includes one or more materials that define a certain rigidity that provide a stiffness (in relation to the media streaming device 102). In some examples, the corresponding port (e.g., HDMI port) of the receiving device 104 is located on a lateral side (or the back side) of the receiving device 104, and when the output cord segment 110 is coupled to the receiving device 104, the output cord segment 110 forces the media streaming device 102 a certain horizontal distance (e.g., more than 50% the length of the output cord segment 110) away from a surface of the receiving device 104. The output cord segment 110 can force the media streaming device 102 away from the surface of the receiving device 104 by not completely bending (e.g., the output cord segment 110 may slightly bend, but may maintain a certain shape until the user put additional force on the output cord segment 110 to move the media streaming device 102 to another location).

In some examples, the output cord segment 110 includes a bendable material, where the output cord segment 110 is configured to hold its shape (e.g., a moldable material). As such, a user may be able to deform the output cord segment 110 into a desired position, e.g., hide the media streaming device 102 from a view of the user, or change the position of the media streaming device 102 relative to the receiving device 104 to increase the RF performance of the media streaming device 102 and/or receiving device 104.

As a result, the radio frequency (RF) performance may be improved. For example, interference from the receiving device 104 on the wireless communication of the media streaming device 102 may be reduced. Also, by placing the media streaming device 102 a distance away from the receiving device 104, adjacent connector ports on the receiving device 104 are not blocked by the media streaming device 102. For example, the receiving device 104 may include multiple ports, and, conventionally, when a device is plugged directly into one of the ports, the device can block one or more adjacent ports such that other devices are prevented from using these adjacent ports.

FIG. 2 illustrates a media streaming device 202 fixedly coupled to a power cord segment 212 and fixedly coupled to an output cord segment 210 according to an implementation.

The media streaming device 202 may be any of the media streaming devices discussed with reference to any of the figures. Referring to FIG. 2, the power cord segment 212 may include a power cord adaptor 209 configured to be plugged into an AC wall socket, and the output cord segment 210 may include an HDMI connector 207 configured to be coupled to a receiving device.

FIG. 3 illustrates a media streaming device 302 removably coupled to a power cord segment 312 and fixedly coupled to an output cord segment 310 according to an implementation. The media streaming device 302 may be any of the media streaming devices discussed with reference to any of the figures. Referring to FIG. 3, the power cord segment 312 may include a connector 315 (e.g., micro-USB connector) on one end portion of the power cord segment 312, a connector 316 (e.g., USB connector) on the other end portion of the power cord segment 312, and a power plug adaptor 317 configured to be removably coupled to the connector 316. The output cord segment 310 may include an HDMI connector 307 configured to be coupled to the receiving device 104.

FIGS. 4A and 4B are diagrams that illustrate an output cord segment 410 including a low-voltage differential signaling (LVDS) connector 415 according to an implementation. FIG. 4A illustrates a first side of the output cord segment 410 and FIG. 4B illustrates a second side of the output cord segment 410. The output cord segment 410 includes a cable portion 411 (which can be a flat cable) and an HDMI connector 425 (which could be another type of media connector) (e.g., HDMI A, standard connector).

In FIG. 4B, an interface 420 of the LVDS connector 415 that can be coupled to (e.g., coupled to a receptacle associated with), for example, a printed circuit board (PCB) (not shown) is illustrated. The interface 420 can include an opening, connector pins, and/or so forth. As illustrated in FIGS. 4A and 4B, the LVDS connector 415 can be a connector that is generally aligned in a direction non-parallel to (e.g., at a right angle to) the cable portion 411. The LVDS connector 415 can be referred to as a top-down connector, and can be coupled to a PCB in a desirable fashion. Accordingly, the interface 420 of the LVDS connector cannot be seen in FIG. 4A. In some implementations, the LVDS connector 415 can be replaced with a different type of connector (e.g., a different type of wire-to-board (WTB) connector), a custom connector with several pins (e.g., a 19 or 20 pin connector). In some implementations, for example, the LVDS connector 415 can be a side-insert LVDS connector.

The cable portion 411 can include one or more wires electrically coupled between the HDMI connector 425 and the LVDS connector 415. In some implementations, the one or more wires can include bundled wires, twisted-pair wires (e.g., twisted shielded pairs), twinaxial cables, microcoaxial cables, and/or so forth.

As illustrated in FIGS. 4A and 4B, mounting tabs (or protrusions) 422A and 422B are coupled to the output cord segment 410. Specifically, the mounting tabs 422A and 422B are coupled to (or integrated as part of) the LVDS connector 415. The mounting tabs 422A, 422B can be used to couple the LVDS connector 415 to, for example, a printed circuit board (not shown) via one or more screws, nails, solder, and/or so forth.

In some implementations, one or more of the mounting tabs 422A, 422B can have a different configuration than shown in FIGS. 4A and 4B. For example, in some implementations, a coupling mechanism can be used in place of one or more of the mounting tabs 422A, 422B, or in conjunction with one or more of the mounting tabs 422A, 422B. The coupling mechanism can include pressfit connections, an adhesive, and/or so forth.

As shown in FIGS. 4A and 4B, a connection portion 440 is used to couple the cable portion 411 (and wires disposed therein) to the LVDS connector 415. In some implementations, the connection portion 440 can be referred to as a crimped portion and can include one or more mechanisms that couple the cable portion 411 to the LVDS connector 415. More details related to the connection portion 440 are described in detail below.

As shown in FIGS. 4A and 4B, the LVDS connector 415 and/or one or more of the mounting tabs 422A and 422B can be disposed within a housing 403 (illustrated by a dashed line) (e.g., housing 103 shown in FIG. 1). Accordingly, the LVDS connector 415 can be coupled to (e.g., coupled via the interface 420 and/or one or more of the mounting tabs 422A, 422B) a PCB (not shown) that is disposed within the housing.

Because the output cord segment 410 (which can be referred to as an HDMI cable assembly) is coupled to the housing in a non-removable fashion (e.g., in a fixedly coupled fashion via the connection portion 440, mounting tabs 422A, 422B, and so forth), the output cord segment 410 can be referred to as being captive. Specifically, the HDMI connector and cable assembly can be referred to as a captive HDMI cable.

FIGS. 5A and 5B are diagrams that illustrate perspective views of an output cord segment 410 including an LVDS connector 415 according to an implementation. The labels that have been used in FIGS. 4A and 4B are also being used in FIGS. 5A and 5B.

Figure 6:
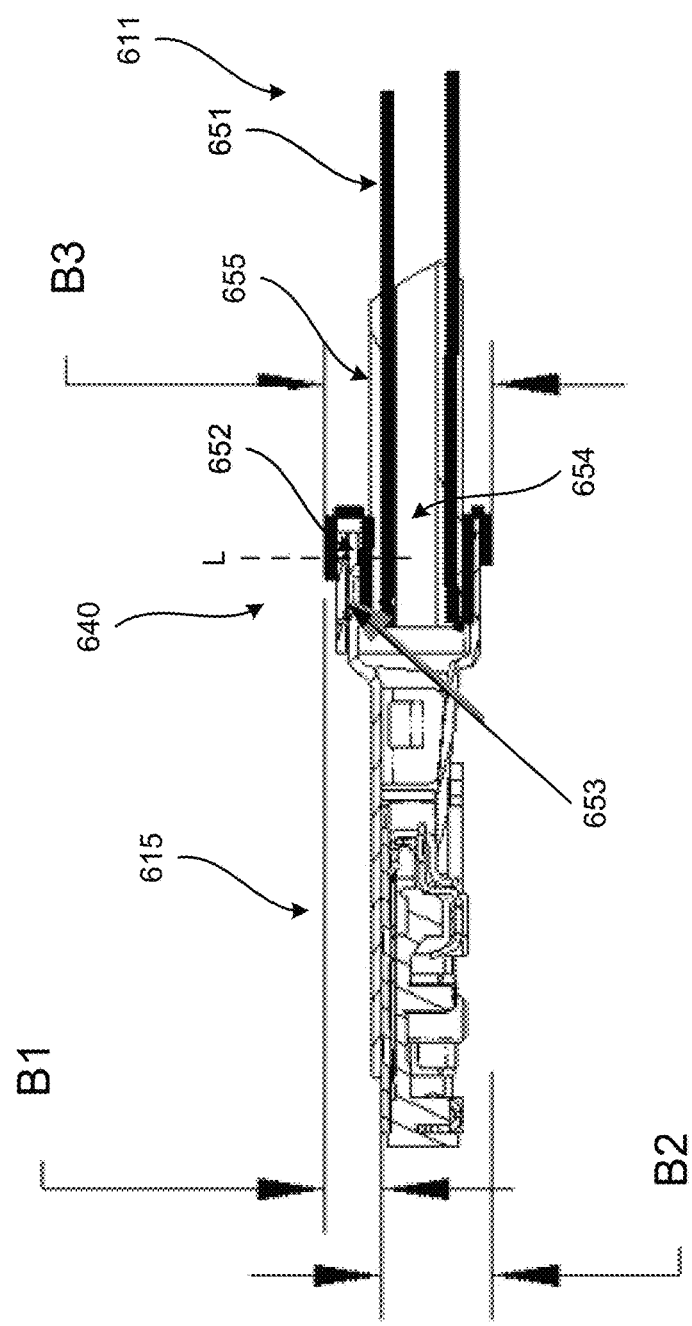
FIG. 6 is a diagram that illustrates a cross-sectional view of a connection portion according to an implementation.

FIG. 6 is a diagram that illustrates a cross-sectional view of a connection portion 640 according to an implementation. The connection portion 640 shown in FIG. 6 can be similar to the connection portions illustrated in other diagrams (e.g., connection portion 440 illustrated in FIGS. 4A through 5B) herein. The connection portion 640 can be configured to couple a cable portion 611 to an LVDS connector 615 (or other WTB connector).

As shown in FIG. 6, the connection portion 640 includes a shield material 651 (e.g., a braided shield), a flexible conductor 652 (e.g., a foil, a copper foil), and a shield connector 653 (e.g., a shield can). One or more wires and/or insulators (not shown in FIG. 6) can be disposed within a wire region 654 of the cable portion 611. In some implementations, the shield connector 653 can be integrated as part of the LVDS connector 615.

As shown in FIG. 6, the connection portion 640 is defined so that several of the components are coupled together in stack. Specifically, if moving along line L from the bottom (starting in the wire region 654), the connection portion 640 includes a first portion of the shield material 651, a sheath (or jacket) material 655 of the cable portion 611, a second portion of the shield material 651, the flexible conductor 652, the shield connector 653, and a third portion of the shield material 651. In some implementations, the shield material 651 and sheath material 655 can each have at least a portion integrated into the cable portion 611.

As shown, the first portion of the shield material 651 is disposed around (or at least partially disposed around) at least a portion of the wire region 654. The sheath material 655 (or a portion thereof) is disposed around at least a portion of the first portion of the shield material 651. Accordingly, the sheath material 655 is disposed between the first portion of the shield material 651 and the second portion of the shield material 651.

As shown, the flexible conductor 652 (or a portion thereof) is disposed around at least a portion of the second portion of the shield material 651. The shield connector 653 (or a portion thereof) is disposed around at least a portion of the flexible conductor 652. The third portion of the shield material 651 is disposed around the shield connector 653 (or a portion thereof). Accordingly, the flexible conductor 652 (or a portion thereof) and the shield connector 653 (or a portion thereof) are disposed between the second portion of the shield material 651 and third portion of the shield material 651.

In some implementations, the shield connector 653 (which is associated with the LVDS connector 615) can be crimped. The shield connector 653 can be crimped to at least a portion of the flexible conductor 652 and/or the second portion of the shield material 651. Accordingly, the shield connector 653 can be crimped around the first and second portions of the shield material 651, the sheath material 655, the flexible conductor 652 and/or other portions of the cable portion 611 (e.g., at least a portion of the wire region 654). This crimping can ensure desirable electrical contact between the shield connector 653 and the shield material 651, can prevent portions of the cable portion 611 from being decoupled from the LVDS connector 615, and/or provide for desirable EMI shielding (through a relatively tight connection).

In some implementations, the third portion of the shield material 651 can be coupled to a portion of the shield connector 653 via, for example, a solder, an adhesive, a conductive glue, a tape, and/or so forth. In some implementations, the flexible conductor 652 can be replaced with a different material such as a conductive glue, a solder, a tape, and/or so forth.

In some implementations, the shield connector 653 can be configured, as described above, with one or more mounting tabs such that the assembly can be coupled to (e.g., screwed down) to a PCB (not shown) and a housing (not shown). This can ensure that the LVDS connector 615 is fully seated, accounts for tolerances (assembly dimensional variances) and keeps the cable assembly (including the LVDS connector 615 and an HDMI connector) rigidly fixed after installation.

In some implementations, at least a portion of the shield connector 653 can be replaced with a flexible conductor (e.g., a copper foil, a relatively thick flexible conductor). In some implementations, a shield connector can be integrated into a part of a PCB and may not be included as part of the LVDS connector (or cable sub-assembly).

This connection portion 640 assembly can allow for a relatively small (e.g., thin) form-factor, and desirable electromagnetic interference (EMI) shielding. This connection portion 640 assembly can also provide for a high strength (or high strain relief) connection that prevents damaging a PCB.

In FIG. 6, thickness measurements are shown as B1, B2, and B3. The thickness B3 can be a sum of thickness B1 and thickness B2. In some implementations, thickness B1 can be less than thickness B2. In some implementations, thickness B2 can be less than or equal to thickness B1.

FIGS. 7A through 7G are diagrams that illustrate a method for manufacturing at least some portions of an output cord segment. The output cords segment can be any of the output cord segments described herein.

FIG. 7A illustrates a cable portion 711 including a sheath material 655. FIG. 7B illustrates at least a portion of the sheath material 755 (and potentially insulating materials disposed therein) removed from around a shield material 751 (e.g., a braided shield) and wires 780 (disposed inside the shield material 751). As shown in 7B, the wires 780 and shield material 751 can have a length C1 that can be on the order of a few millimeters or centimeters. In some implementations, the cable portion 711 may not include a sheath material 755.

FIG. 7C illustrates the shield material 751 (or a portion thereof) being moved from a position around the wires 780 to a position around the sheath material 755 of the cable portion 711. In other words, the shield material 751 can be pulled back from being disposed around the wires 780. Also, a flexible conductor 752 (e.g., a foil, a copper foil) is coupled to the shield material 751. In some implementations, the flexible conductor 752 can be wrapped around the shield material 751 without being wrapped around at least one or more of the wires 780 so that the wires 780 are exposed. In some implementations, the shield material 751 (or a portion thereof) can be adhesively held (e.g., held using a tape) during subsequent steps.

In this implementation shown in FIG. 7C, each of the six wires 780 is a bundle of wires such as a twisted pair of wires. In some implementations, one or more of the wires 780 shown in FIG. 7C can be an individual wire.

As shown in FIG. 7D, the wires 780 are coupled to at least a portion 714 of a connector such as an LVDS connector. In some implementations, portion 714 can be an interface portion. In some implementations, the portion 714 can be referred to as a connector shell. In some implementations, one or more of the wires 780 can be soldered to the connector 715. In some implementations, the portion 714 can be crimped to one or more of the wires 780.

As shown in FIG. 7E, a shield connector 753 (e.g., a shield can) has a least a portion that is disposed around the portion 714 of the connector, at least a portion of the flexible conductor 752, at least a portion of the sheath material 755, at least a portion of the cable portion 711, and so forth. The shield connector 753 has a portion 757 that is crimped to the flexible conductor 752 as shown in FIG. 7F. Also, mounting tabs (not labeled) are illustrated as part of the shield connector 753.

Figure 7G:
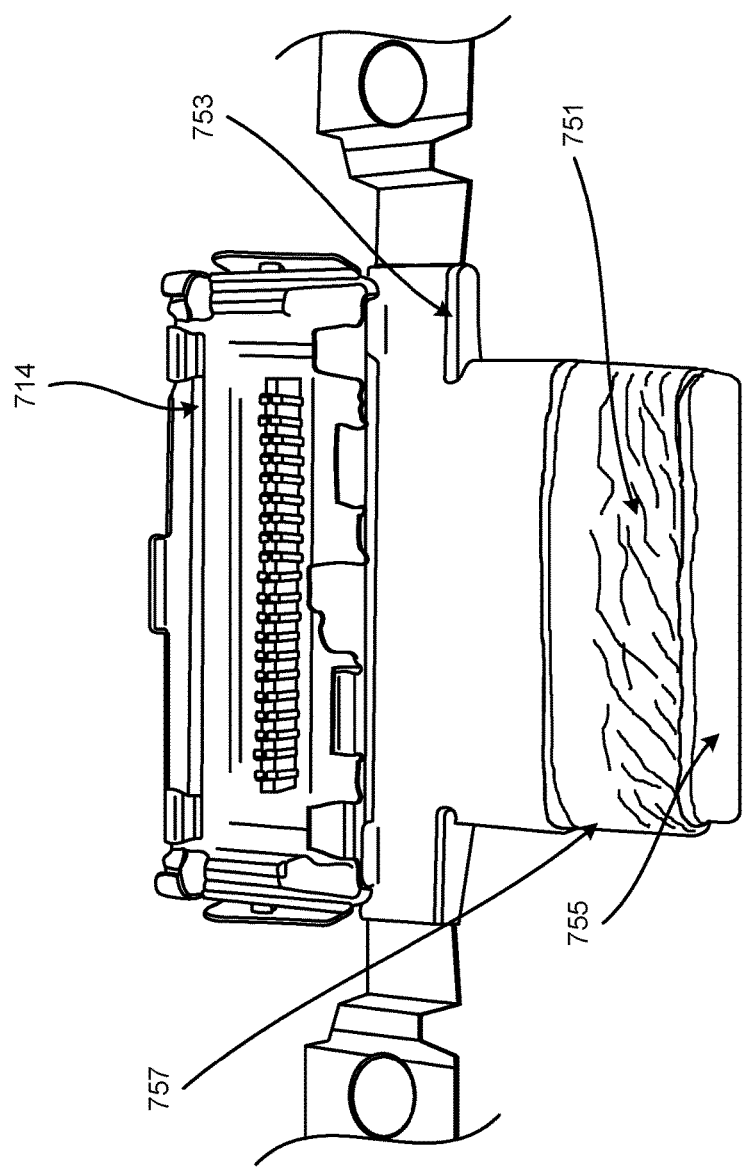

As shown in FIG. 7G, the shield material 751 (or a portion thereof) is moved over the portion 757 that is crimped to the flexible conductor 752. If the shield material 751 is being adhesively held, the adhesive can be removed so that the shield material (or a portion thereof) can be moved over the portion 757 of the shield connector 753 (or another portion of the shield connector 753 in some implementations). In this implementation, the shield material 751 is soldered to the portion 757 of the shield connector 753 (or another portion of the shield connector 753 in some implementations). In some implementations, the shield material 751 can be coupled around 360° or substantially an entire circumference of the portion 757 of the shield connector 753 (or another portion of the shield connector 753 in some implementations). In some implementations, instead of soldering on top of the portion 757 the shield connector 753, solder can be applied to a side or edge of the connector shield connector 753 (or a portion thereof).

The methods and apparatus described herein can be used to ensure that the shield material 751 has a desirable (e.g., good, robust) connection to the shield connector 753. If the raw cable of the cable portion 711 shrinks or changes over the lifetime due to the environment (e.g., temperature, humidity exposure) this helps to ensure that desirable contact is maintained.

As described herein, as opposed to simply crimping the shield connector 753 to the cable portion 711, the method and apparatus described herein ensure full contact between the shield connector 753 and the shield material 751, and ensures that the connection will be maintained over years.

Figure 8:
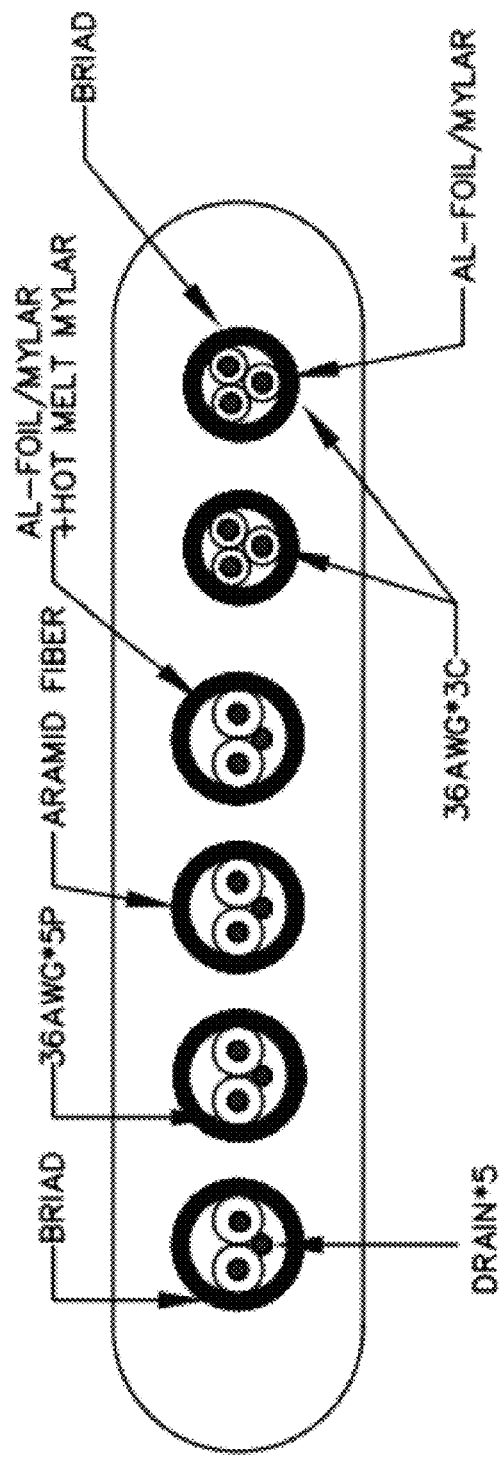
FIG. 8 is a diagram that illustrates a cross-section of wires that can be included in an output cord segment.

FIG. 8 is a diagram that illustrates a cross-section of wires that can be included in an output cord segment. In some implementations, the wires can be similar to the wires 780 shown in FIGS. 7A through 7G.

Figure 9:
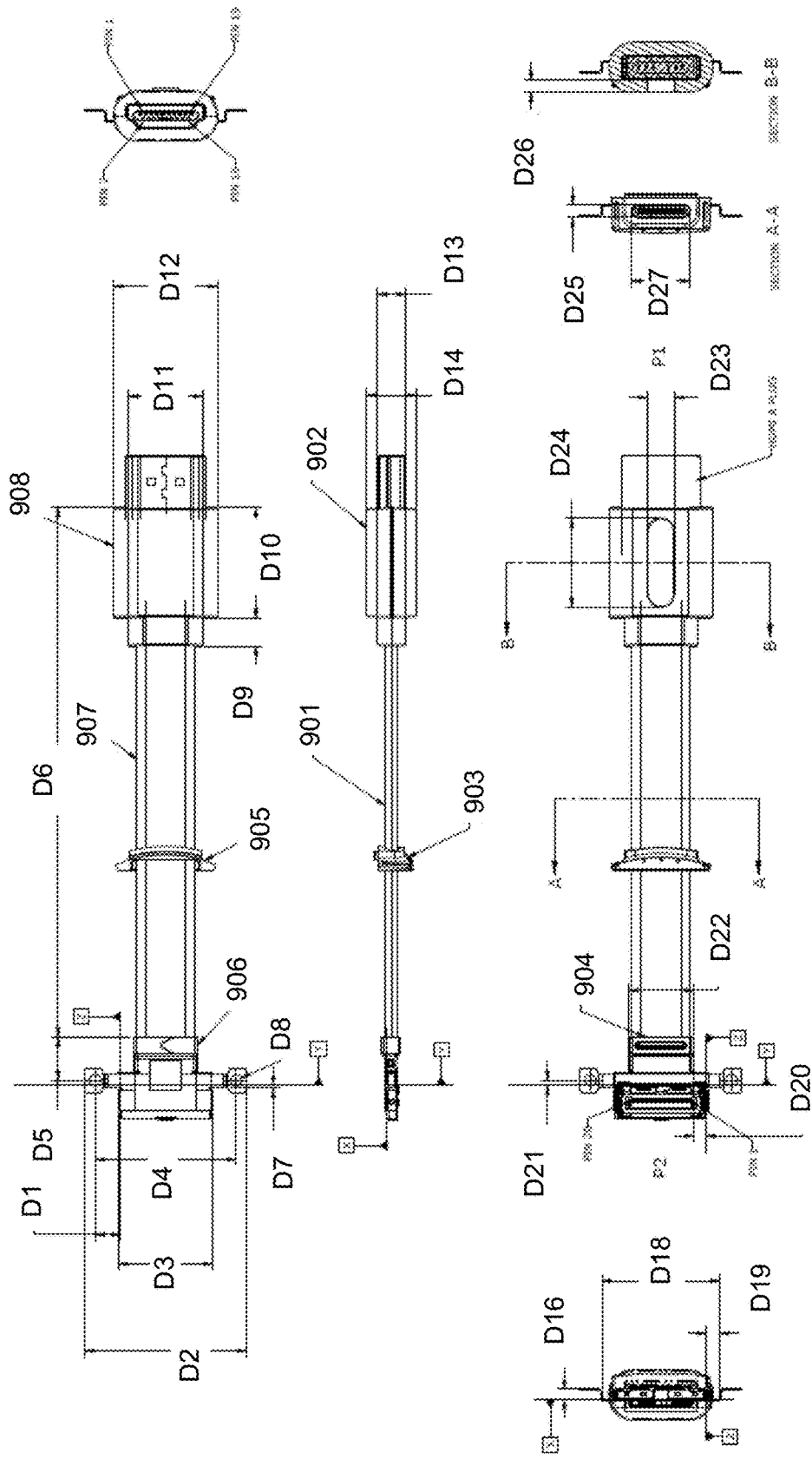
FIGS. 9 and 10 are diagrams that illustrate various views of an output cord segment.
Figure 10:
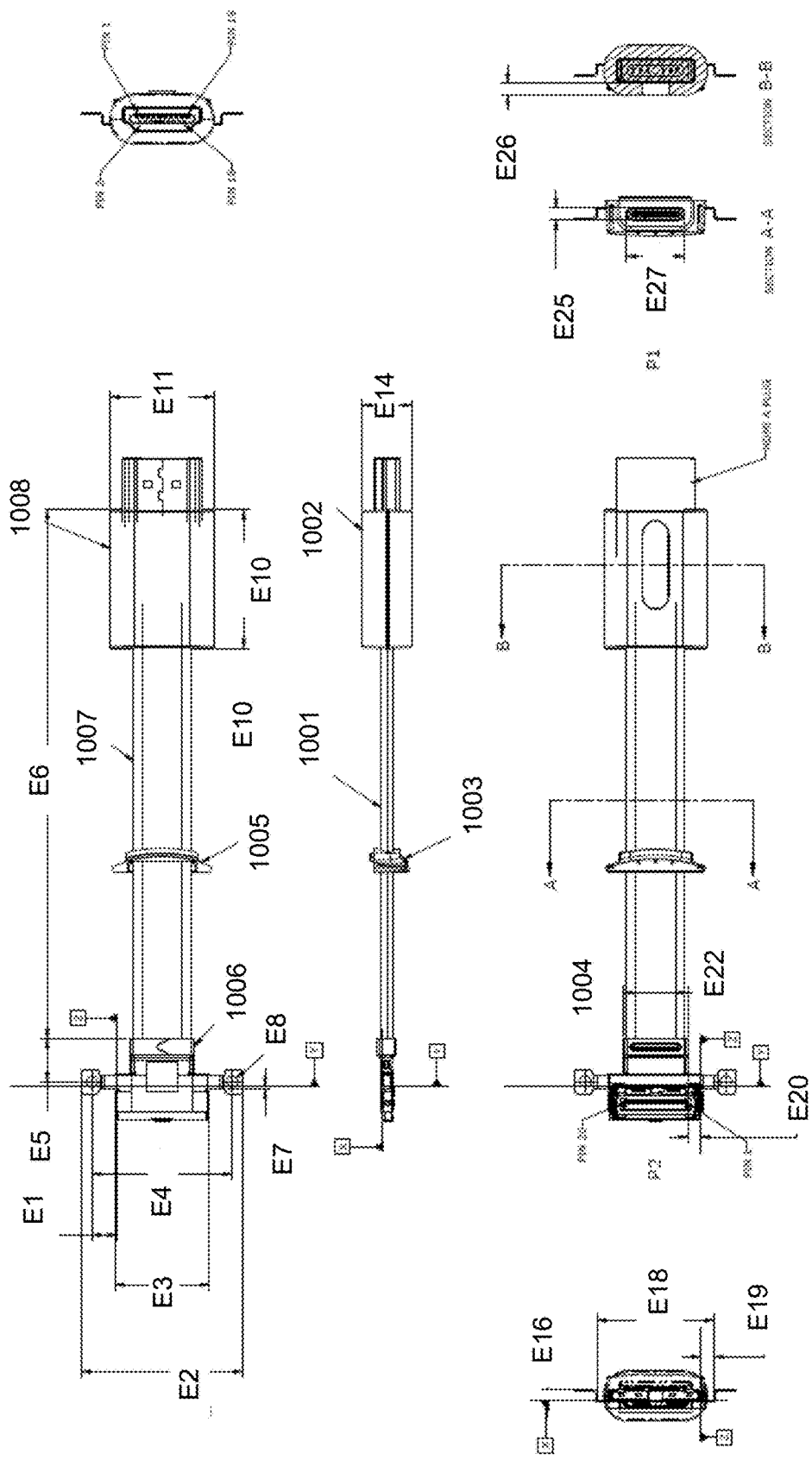
Figure 11B:
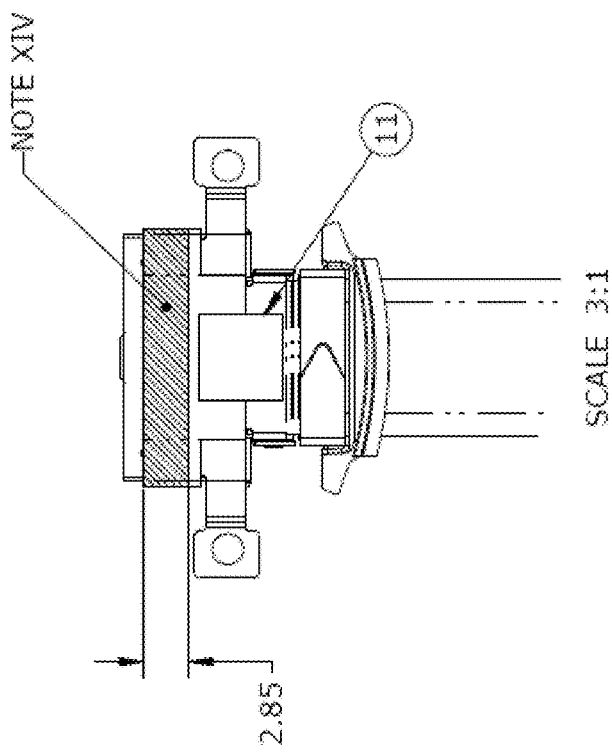
FIGS. 11A and 11B are diagrams that illustrate views of a cable portion and LVDS connector coupled to the cable portion.
Figure 11A:
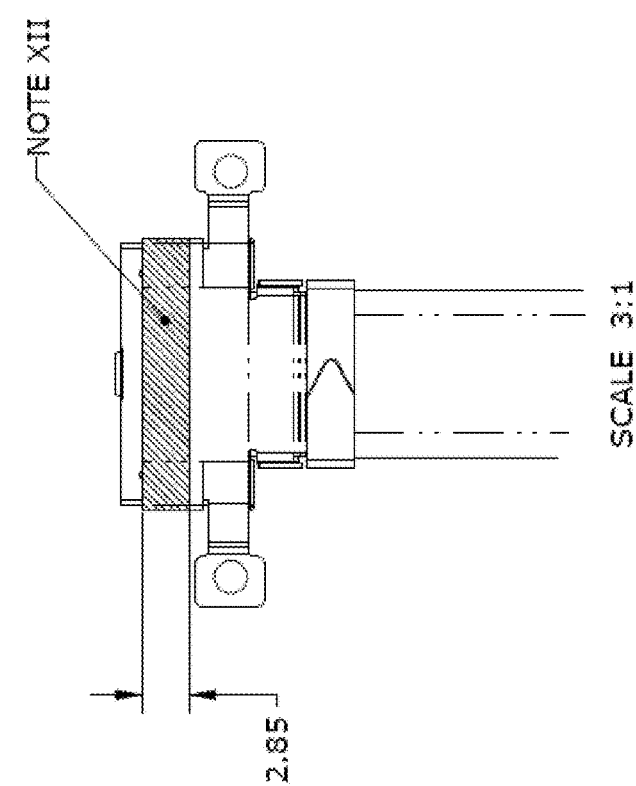

FIGS. 9 and 10 are diagrams that illustrate various views of an output cord segment. FIGS. 11A and 11B are diagrams that illustrate views of a cable portion and LVDS connector coupled to the cable portion.

Figure 12:
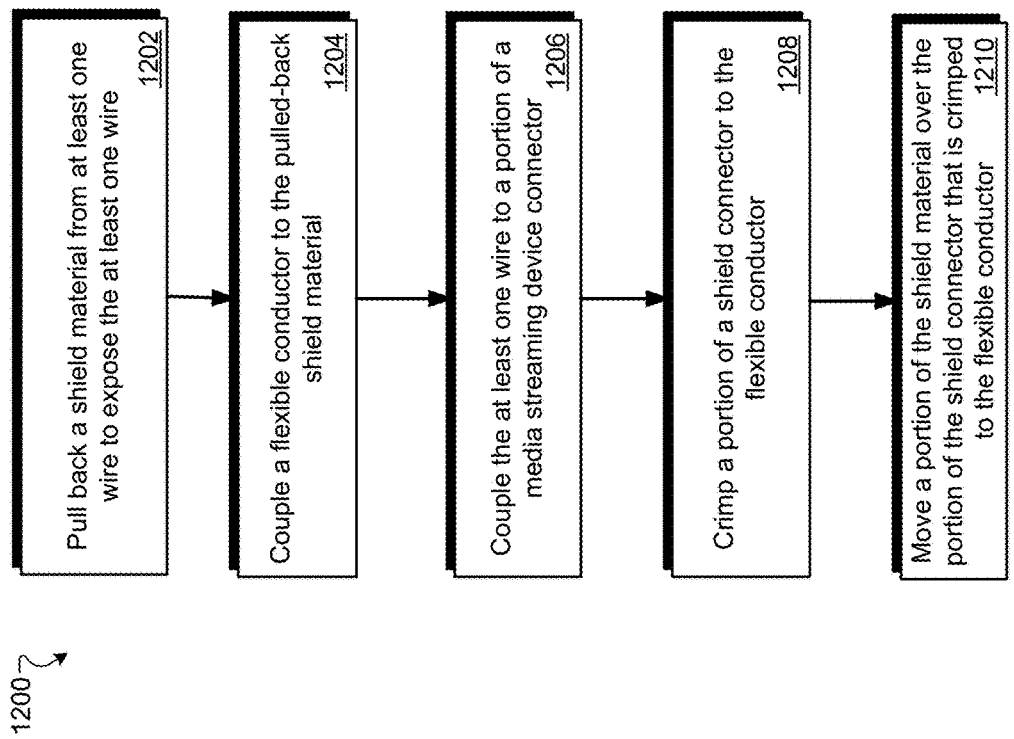
FIG. 12 is a flow diagram illustrating a method for manufacturing an output cord segment according to an implementation.

FIG. 12 illustrates an example method 1200 for manufacturing at least some portions of an output cord segment. The method 1200 may be performed in a cable portion of the output cord segment, the cable portion including (i) a wire region within which at least one wire is disposed and (ii) a shield material disposed under the sheath material and surrounding the at least one wire.

At 1202, the shield material is pulled back from the at least one wire to expose the at least one wire.

At 1204, a flexible conductor is coupled to the pulled-back shield material.

At 1206, the at least one wire is coupled to a portion of a media streaming device connector.

At 1208, a portion of a shield connector is crimped to the flexible conductor, the shield connector being disposed around the portion of a media streaming device connector.

At 1210, a portion of the shield material is moved over the portion of the shield connector that is crimped to the flexible conductor.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electronic apparatus, comprising:
a media streaming device configured to stream media signals carrying media, the media streaming device including a housing; and
an output cord segment including:
a media streaming device connector disposed in the housing of the media streaming device;
a receiving device connector configured to couple the output cord segment to a receiving device, the receiving device being configured to render the media;
a cable portion situated between and electrically coupling the media streaming device connector and the receiving device connector; and
a connection portion configured to couple the cable portion to the media streaming device connector, the connection portion including a stack, the stack including:
a first portion of a shield material;
a flexible conductor;
a shield connector; and
a second portion of the shield material,
the media streaming device connector being a low voltage differential signaling (LVDS) connector; and
the shield connector being integrated into a portion of the LVDS connector.

2. The electronic apparatus as in claim 1, wherein a portion of the shield connector is coupled to the flexible conductor.

3. The electronic apparatus as in claim 1, wherein the second portion of the shield material is coupled to a portion of the shield connector.

4. The electronic apparatus as in claim 3, wherein the second portion of the shield material is coupled to the portion of the shield connector via a solder.

5. The electronic apparatus as in claim 1, wherein the cable portion further includes the shield material of the connection portion.

6. The electronic apparatus as in claim 1, wherein the receiving device connector is a high-definition multimedia interface (HDMI) connector.

7. The electronic apparatus as in claim 1, wherein the cable portion includes a sheath material, and
wherein the stack of the connection portion includes a portion of the sheath material, the portion of the sheath material being surrounded by the first portion of the shield material.

8. The electronic apparatus as in claim 1, wherein the shield material includes a braided shield.

9. The electronic apparatus as in claim 1, wherein the flexible conductor includes a foil material.

10. The electronic apparatus as in claim 1, wherein the shield connector includes a shield can.

11. The electronic apparatus as in claim 1, wherein the shield connector includes at least one mounting tab by which the stack may be fixedly connected to a PCB board.

12. The electronic apparatus as in claim 1, wherein the shield connector is integrated into a PCB board.

13. The electronic apparatus as in claim 1, wherein the cable portion further includes a wire region within which at least one wire is disposed, the at least one wire providing electrical coupling between the media streaming device connector and the receiving device connector.

14. The electronic apparatus as in claim 13, wherein the first portion of the shield material is at least partially disposed around at least a portion of the wire region.

15. A method for manufacturing an output cord segment configured to be coupled to a media streaming device, the method comprising:
  in a cable portion of the output cord segment, the cable portion including (i) a wire region within which at least one wire is disposed and (ii) a shield material and surrounding a wire:
    moving a portion of the shield material from over the wire to expose the wire;
    coupling a flexible conductor to the portion of the shield material;
    coupling the wire to a portion of a media streaming device connector;
    coupling a portion of a shield connector to the flexible conductor, the shield connector being disposed around the portion of a media streaming device connector; and
    moving a portion of the shield material over the portion of the shield connector that is coupled to the flexible conductor,
  the media streaming device connector being a LVDS connector; and
  the shield connector being integrated into a portion of the LVDS connector.

16. The method as in claim 15, wherein the cable portion further includes a sheath material disposed around the wire region, and
  wherein the method further comprises:
    prior to moving the portion of the shield material, removing at least a portion of the sheath material; and
    wherein moving the portion of the shield material includes disposing the shield material around the sheath material.

17. A method as in claim 15, further comprising coupling the portion of a media streaming device connector to the wire.

18. A method as in claim 15, further comprising after moving the portion of the shield material over the portion of the shield connector that is coupled to the flexible conductor, soldering the portion of the shield material to the portion of the shield connector.

19. An electronic apparatus, comprising:
  a media streaming device configured to stream media signals carrying media, the media streaming device including a housing; and
  an output cord segment including:
    a media streaming device connector disposed in the housing of the media streaming device;
    a receiving device connector configured to couple the output cord segment to a receiving device, the receiving device being configured to render the media;
    a cable portion situated between and electrically coupling the media streaming device connector and the receiving device connector; and
    a connection portion configured to couple the cable portion to the media streaming device connector, the connection portion including a stack, the stack including:
      a first portion of a shield material;
      a second portion of the shield material;
      a sheath material disposed between the first portion and the second portion of the shield material;
      a flexible conductor disposed around a portion of the second portion of the shield material;
      a shield connector disposed around at least a portion of the flexible conductor; and
      a third portion of the shield material coupled to a portion of the shield connector.

20. The electronic apparatus as in claim 19, wherein the shield connector is crimped to at least one of a portion of the flexible conductor and the second portion of the shield material.

21. The electronic apparatus as in claim 19, wherein the output cord segment is configured to maintain the media streaming device at a distance of at least 50% of a length of the output cord segment from a surface of the receiving device.

* * * * *